United States Patent
Haberl et al.

(10) Patent No.: US 8,167,354 B2
(45) Date of Patent: May 1, 2012

(54) TOP FOR A CONVERTIBLE

(75) Inventors: Franz Haberl, Wallerfing (DE); Georg Kopp, Plattling (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 637 days.

(21) Appl. No.: 12/289,356

(22) Filed: Oct. 24, 2008

(65) Prior Publication Data
US 2009/0108623 A1  Apr. 30, 2009

(30) Foreign Application Priority Data

Oct. 24, 2007 (DE) .......................... 10 2007 051 120
Oct. 24, 2007 (DE) .......................... 10 2007 051 121

(51) Int. Cl.
*B60J 7/14* (2006.01)
*B60J 7/08* (2006.01)
(52) U.S. Cl. .................................. 296/108; 296/107.15
(58) Field of Classification Search ............ 296/107.15, 296/108, 121, 122, 107.16, 107.17, 116, 296/117, 107.09
See application file for complete search history.

(56) References Cited

U.S. PATENT DOCUMENTS

| | | | |
|---|---|---|---|
| 6,422,637 B1 | 7/2002 | MacFarland | |
| 6,425,622 B2 | 7/2002 | Eberle | |
| 7,607,715 B2 * | 10/2009 | Beierl et al. | 296/108 |
| 7,780,217 B2 * | 8/2010 | Halbweiss | 296/107.09 |
| 2008/0061587 A1 | 3/2008 | Beierl et al. | |
| 2008/0277962 A1 * | 11/2008 | Beierl | 296/107.07 |

FOREIGN PATENT DOCUMENTS

| | | |
|---|---|---|
| DE | 196 42 152 A1 | 4/1998 |
| DE | 100 06 296 C1 | 5/2001 |
| DE | 100 65 324 B4 | 8/2004 |
| DE | 10 2005 018 681 B4 | 1/2007 |
| DE | 10 2006 042 295 A1 | 3/2008 |
| EP | 0 835 780 B1 | 7/2001 |
| EP | 1 092 579 B1 | 6/2002 |

* cited by examiner

*Primary Examiner* — Glenn Dayoan
*Assistant Examiner* — Melissa A Black
(74) *Attorney, Agent, or Firm* — Davidson, Davidson & Kappel, LLC

(57) ABSTRACT

The invention relates to a top for a convertible, comprising a front bow, a first surface bow, a second surface bow, and a main link mechanism being adapted to displace the front bow, the first surface bow and the second surface bow with respect to a body-mounted main bearing unit in order to open or to close the top, wherein the main link mechanism comprises a main pillar and a main link, wherein, when the top is closed, the front bow, the first surface bow and the second surface bow cover an interior space of the convertible, wherein the first surface bow is arranged between the front bow and the second surface bow, wherein a first supporting link connects the second surface bow in an articulated manner to the main pillar, and wherein a second supporting link connects the second surface bow in an articulated manner to the main link.

39 Claims, 11 Drawing Sheets

TOP FOR A CONVERTIBLE

Priority is claimed to German Patent Application 10 2007 051 120.7-24, filed on Oct. 24, 2007, and to German Patent Application 10 2007 051 121.5-24, filed on Oct. 24, 2007, the entire disclosure of which is incorporated by reference herein.

BACKGROUND OF THE INVENTION

The invention relates to a top for a convertible in general and in particular in the case of four-seater vehicles, the top comprises at least three rigid roof parts or surface bows in order to be able to completely cover the interior space of the vehicle in the closed state of the top. Diverse forms of convertible tops are known.

DE 100 06 296 C1 shows a top for a convertible vehicle comprising a main roof element and two further roof elements arranged movably thereon. The main roof element is mounted pivotably by means of a link mechanism on a body-mounted main bearing device. During opening of the top from a closed state of the top, the two further roof elements and the main roof element can be arranged one above another to form a package which can be stowed in a rear region of the vehicle. In the stowed position, because of the comparatively large longitudinal extent of its roof elements, said top takes up a relatively large amount of construction space.

EP 1 092 579 B1 shows a retractable motor vehicle top for a four-seater convertible. This top comprises a first, front roof section, a second, central roof section arranged behind the first roof section and a rear roof section arranged at the rear end of the convertible, wherein said roof sections, in the closed position of the top, are arranged one behind another and cover the passenger compartment. In the case of this top too, the individual partial roof sections have a comparatively large longitudinal extent which, in the stowed position of the top, disadvantageously results in a large construction space being occupied by the top.

DE 10 2006 042 286 A1 describes a stowable top for a convertible comprising a front bow, a first surface bow, a second surface bow and a rear window frame which together, in the closed position of the top, cover a vehicle interior space. The top is held by a main link mechanism which is designed as a main four-bar linkage and comprises a main pillar and a main link, wherein the first surface bow forms the connecting bar of the main four-bar linkage. At its front end adjacent to the first surface bow, the second surface bow is connected in an articulated manner to the main pillar by means of a first supporting link. The second surface bow furthermore comprises, at its rear end which faces the rear window frame, a second supporting link which is accommodated pivotably in a linear guide of the rear window frame and therefore connects the second surface bow to the rear window frame outside of the main link mechanism.

DE 196 42 152 A1 describes a convertible top comprising a front bow, a first roof shell part and a second roof shell part enclosing a rear window. The second roof shell part is connected pivotably to the vehicle body by means of a main pillar and a main link. The first roof shell part is accommodated on the second roof shell part by means of a first articulated connection, wherein the first articulated connection comprises a first link, a second link and a coupling link accommodated on the first roof shell part. The first link connects the first roof shell part in an articulated manner to the main link, and the second link connects the coupling link in an articulated manner to the second roof shell part such that the first roof shell part can be pivoted tinder the second roof shell part by pivoting of the first articulated connection. The front bow is accommodated on the first roof shell part by means of a second articulated connection, wherein the second articulated connection comprises a third link and a fourth link. The third link connects the front bow pivotably to the first roof shell part, and the fourth link connects the front bow pivotably to the coupling link such that the front bow can be shifted under the first roof shell part by pivoting of the second articulated connection and there is overall a positively controlled coupling of the front bow, the first roof shell part and the second roof shell part.

Further convertible tops which have a front bow, a surface bow arranged therebehind and a rear window element with a rear window are known in the prior art. With these tops, the surface bow is guided in a translatory manner in the longitudinal axis of the vehicle by a sliding guide, with it being displaced at least partially under the rear window element by said sliding guide during opening of the top. Such a solution has the disadvantage that the sliding guide may result in jamming or rattling of the surface bow or the like.

Conventional tops for convertibles, in particular "soft tops", i.e. tops with a flexible top cloth, comprise a tensioning bow which, in the closed position of the top, suitably places the top cloth under tension such that the top cloth is taut in the region of the C pillar. The kinematic structure for such a tensioning bow requires a multiplicity of link elements in order to ensure suitable displacement of the tensioning bow during opening and closing of the roof.

DE 10 2005 018 681 B4 shows a fabric top for a convertible, comprising two main link mechanisms which are arranged in a mirror-inverted manner on both sides of the vehicle, each main link mechanism comprising a front main pillar and a rear main link. Pivoting of the main link mechanism relative to the vehicle body makes it possible for the top as a whole to be stowed in a rear region of the vehicle. In the closed state of the top, a top fabric spans an interior space of the vehicle, wherein a rear end of the top fabric is fastened to a tensioning bow which is coupled pivotably at its respective ends on both sides of the convertible to a lowering lever. A pivoting movement of the tensioning bow during an opening or closing movement of the top can be controlled in this case by pivoting the lowering lever. The lowering lever is designed as a toggle lever and is connected pivotably at its first end to the tensioning bow. The lowering lever is accommodated in an articulated manner in a central region on the front main pillar and in an articulated manner at its second end opposite the first end on a control link which, in turn, is arranged pivotably on a main bearing unit at its end opposite the lowering lever. The front main pillar, the lowering lever, the control link and the main bearing unit together form a four-bar linkage by means of which a lowering of the tensioning bow is controlled. Separate coupling of a rear window frame is not provided.

DE 100 65 324 B4 describes a fabric top for a convertible, comprising a front bow, an intermediate bow and a fixed rear bow which are each accommodated on lateral roof frame parts. In a closed position of the top, the front bow adjoins a cowl of the vehicle windshield. In an initial phase of an opening movement of the top, the front bow and the intermediate bow are shifted in a guide along the lateral roof links to the rear fixed bow, whereupon, in a second phase of the opening movement, the lateral roof links are folded about a respectively vertical axis of rotation onto the rear fixed bow. A rear edge of the top fabric is accommodated on a three-part tensioning bow which comprises a central section running substantially rectilinearly and two short, curved sections. The short, curved sections are accommodated on the central section by means of a slotted guide mechanism such that the tensioning bow can be changed as a whole in its length and, in particular, can be shortened for stowing the tensioning bow in a top compartment. A rear window of the vehicle is accommodated on the central section of the tensioning bow in a manner such that it can pivot about a horizontal axis. A retaining device which spans the vehicle in the transverse direction and can be shortened in its longitudinal extent is connected to the top linkage and the tensioning bow. The retaining device is accommodated in a sliding manner on guide rails. After the lateral roof frame sections are folded in onto the rear fixed bow and the tensioning bow is shortened, all of the top parts can be brought along the guide rails into a top stowage space.

SUMMARY OF THE INVENTION

It is a first object of the invention to provide a top for a convertible, which top has a space-saving and simple kinematic structure for a tensioning bow.

It is a further object of the invention to provide a top for a convertible, which top takes up little construction space in its open position and has an improved kinematic structure for a surface bow.

A top according to a first aspect of the invention comprises a front bow, a first surface bow, a second surface bow and a main link mechanism being adapted to displace the front bow, the first surface bow and the second surface bow with respect to a body-mounted main bearing unit in order to open or to close the top. The main link mechanism comprises a main pillar and a main link. When the top is closed, the front bow, the first surface bow and the second surface bow cover an interior space of the convertible, wherein the first surface bow is arranged between the front bow and the second surface bow. A first supporting link connects the second surface bow in an articulated manner to the main pillar and a second supporting link connects the second surface bow in an articulated manner to the main link.

By means of the articulated connection of the second surface bow to the main link mechanism, the second surface bow can be displaced with respect to the main link mechanism in a play-free manner during opening and closing of the top. This eliminates the risk of rattling, jamming or the like. During opening and closing of the top, the articulated connection of the second surface bow to the main link mechanism ensures that the second surface bow is displaced in a space-saving manner with respect to the first surface bow located in front of it, and its displacement fits harmoniously into the overall sequence of movement of the kinematic structure of the main link mechanism.

Expediently, the main link mechanism can be designed as a main four-bar linkage, with the main pillar as front link and the main link as rear link. In this case, the body-mounted main bearing unit defines a base of the main four-bar linkage, wherein the main pillar and the main link are connected to each other in an articulated manner by means of a main coupling member. The second surface bow can be connected in an articulated manner to the main pillar by means of one of the first supporting link and the second supporting link in a portion of the second surface bow in the vicinity of the front edge or adjacent thereto and the second surface bow can be connected in an articulated manner to the main link by means of the other of the first supporting link and the second supporting link in a portion of the second surface bow in the vicinity of the rear edge or adjacent thereto. This expediently results, during opening of the top from a closed state of the top, in the second surface bow being able to be displaced below the first surface bow and forward in a direction towards the first surface bow when the main link mechanism is pivoted rearward with respect to the main bearing unit. If the top according to the invention is designed as a soft top with a top cloth which, in the closed position of the top, bears on the outside under tension at least against the first and second surface bows, the abovementioned kinematic structure for the second surface bow affords the advantage that, during opening and closing of the top, pivoting of the first surface bow and the second surface bows does not result in overstretching of the fabric in a region between a rear edge of the front bow and a front edge of the rear window. This effect is also assisted in that, during rearward pivoting of the main four-bar linkage, the second surface bow is shifted, inclined obliquely, below the first surface bow.

Expediently, a control link can be assigned to one of the first supporting link and the second supporting link, the control link being connected in an articulated manner to the main bearing unit such that said one of the first supporting link and the second supporting link is operated by said control link during a pivot movement of the main link mechanism with respect to the main bearing unit. Therefore, when the main link mechanism is pivoted about the main bearing unit, the second surface bow is also automatically displaced relative to the first surface bow such that active control elements are not required for the second surface bow. The control link can expediently be coupled to the second supporting link adjacent to a joint between the second supporting link and the main link such that, during pivoting of the main link mechanism with respect to the main bearing unit, a torque is exerted on the second supporting link relative to the main link. This results in the explained, automatic displacing of the second surface bow.

The front bow can be displaced with respect to the main four-bar linkage in a space-saving manner by a front four-bar linkage having a front link and a rear link, wherein the front bow is fastened to a connecting bar of the front four-bar linkage or itself defines said connecting bar. A reduction in the number of components and automatic operation of the front four-bar linkage are obtained by a base of the front four-bar linkage being defined by a part of the main coupling member of the main four-bar linkage, which part is extended forward beyond a connecting joint of the main pillar and the main connecting member, and by the rear link of the front four-bar linkage being defined by a part of the main pillar of the main four-bar linkage, which part is extended upward beyond the connecting joint of the main pillar and the main coupling member. In other words, the main connecting member and the main pillar of the main four-bar linkage are respectively extended forward and upward beyond their connecting joint and therefore respectively form the base and the rear link of the front four-bar linkage.

Expediently, a rear window frame having a front edge and a rear edge can be connected in the region of its front edge or in the vicinity thereof in an articulated manner to the main bearing unit by means of a chain of links. The articulated connection between the rear window frame and the main bearing unit permits a space-saving displacing of the rear window frame during opening and closing of the top, wherein, in a closed position of the top, the rear window frame is raised obliquely upward and abuts a rear edge of the surface bow located in front of it. In a stowed, i.e. open position of the top, its individual roof parts or roof bows are arranged one above another to form a package, wherein the rear window frame is positioned substantially parallel to the tensioning bow.

Expediently, the rear window frame can be connected at its rear edge in an articulated manner to the tensioning bow by means of an auxiliary link. The front edge of the rear window frame can be connected in an articulated manner to the main bearing unit by means of a chain of links. This kinematic structure of the links permits the abovementioned displacing of the rear window frame between the closed and open positions of the top. Expediently, the chain of links provided at the front edge of the rear window frame can comprise a first and second connecting link, which connecting links are connected in an articulated manner to each other. In this case, the second connecting link is connected in an articulated manner by its free end to the main bearing unit, and the first connecting link is coupled by its free end in the region of the front edge of the rear window frame or in the vicinity thereof. To ensure a defined displacing of the rear window frame, the chain of links can be activated by means of the main four-bar linkage. This can take place by means of an intermediate link which connects the main link of the main four-bar linkage in an articulated manner to the first or second connecting link. This has the consequence that, during pivoting of the main four-bar linkage with respect to the main bearing unit, the rear window frame is displaced relative to the tensioning bow and, in the closed or open-position of the top, is displaced into the abovementioned positions.

Expediently, the tensioning bow can be connected in an articulated manner to the main bearing unit by means of a four-bar linkage. In this case, a base of the four-bar linkage is formed by the main bearing unit, and a connecting rod of the four-bar linkage is formed by one end of the tensioning bow, which end is adjacent to the main bearing unit.

The four-bar linkage comprises a front link and a rear link, wherein the rear link is defined by a lower part of the second connecting link of the chain of links by which the front edge of the rear window frame is coupled to the main bearing unit. The coupling of the tensioning bow to the main bearing unit by means of a four-bar linkage permits a space-saving and precise displacing of the tensioning bow during opening and closing of the top, wherein the tensioning bow is operated via the second connecting link which is connected in an articulated manner via the intermediate link to the main link of the main four-bar linkage. Accordingly, during pivoting of the main four-bar linkage relative to the main bearing unit, the tensioning bow is displaced automatically in a translatory manner.

A top according to a second aspect of the invention comprises a front bow, a main link mechanism being adapted to displace the front bow with respect to a body-mounted main bearing unit in order to open or to close the top, a first connecting link, a second connecting link defining a lowering lever and a tensioning bow which is connected in an articulated manner to the lowering lever which is connected in an articulated manner to the main bearing unit, wherein the first connecting link is connected in an articulated manner to an end of the lowering-lever being opposite to the main bearing unit, and wherein the first connecting link is connected in an articulated manner to one of a rear window frame and a rear window.

The lowering lever and the first connecting link together form a chain of links in the form of a toggle lever mechanism. If the first connecting link is connected in an articulated manner to a front edge of a rear window frame or to a rear window, then the rear window frame or the rear window can be displaced by operation of said toggle lever mechanism during opening of the top into a position in which said rear window frame and rear window are arranged substantially parallel to the tensioning bow. This also applies in the situation if the connecting link is coupled to the rear window frame or the rear window at the side edge thereof and in a substantially central section thereof. The lowering lever fulfills a dual function: firstly, it ensures guidance of the tensioning bow, and secondly it is part of the toggle lever mechanism, by means of which the rear window frame or the rear window is connected in an articulated manner to the main bearing unit.

A front bow is to be understood as that part of the top which, in the closed position of the top, is in contact with a cowl or an upper edge of a windshield. The front bow may, in the case of a soft top, be designed as a surface bow. In the case of a hard top, the front bow may be designed as a substantially rigid roof shell element.

Expediently, it is possible for the lowering lever to be operated by means of the main link mechanism. An intermediate lever is suitable for this purpose, said intermediate lever being connected in an articulated manner by one end to a link of the main link mechanism and by its other end to the lowering lever or to the connecting link. By this means, during pivoting of the main link mechanism with respect to the main bearing unit, the lowering lever is likewise automatically pivoted with respect to the latter such that a separate driving device for the tensioning lever is not required.

A space-saving kinematic structure for coupling the tensioning lever to the main bearing unit arises if it is connected in an articulated manner at its free end or at least adjacent thereto to an additional link which is connected in an articulated manner to the main bearing unit. The additional link together with the lowering link respectively define a link of a four-bar linkage, a base of which is formed by the main bearing unit and a connecting bar of which is formed by a free end of the tensioning bow. This four-bar linkage is operated by the lowering lever which is connected in an articulated manner to the main link mechanism by means of the intermediate link. As an alternative to this, the intermediate link can also be coupled to the first connecting link, as a result of which the four-bar linkage, by means of which the tensioning bow can be shifted with respect to the vehicle body, is, however, operated in the same manner.

The coupling of the tensioning bow to the main bearing unit by means of the abovementioned four-bar linkage permits a space-saving and precise displacing of the tensioning bow during opening and closing of the top, wherein the tensioning bow is operated via the lowering link which is connected in an articulated manner via the intermediate link to a main link or a main pillar of the main link mechanism in the form of a main four-bar linkage. Accordingly, during pivoting of the main four-bar linkage relative to the main bearing unit, the tensioning bow is displaced automatically in a translatory manner.

Expediently, the top can comprise a first surface bow and a second surface bow which is connected in an articulated manner to the main link mechanism, wherein, when the top is closed, the first surface bow is arranged between the front bow and the second surface bow. The main link mechanism is expediently designed as a main four-bar linkage, with a front main pillar and a rear main link. In this case, the body-mounted main bearing unit forms the base of the main four-bar linkage, wherein the main pillar and the main link are connected to each other in an articulated manner by means of a main coupling member. The second surface bow can be connected in an articulated manner at its front edge to the main pillar by means of a first supporting link and can be connected in an articulated manner at its rear edge to the main link by means of a second supporting link. This expediently results, during opening of the top from a closed state of the top, in the second surface bow being able to be displaced below the first surface bow and forward in a direction towards the first surface bow when the main link mechanism is pivoted rearward with respect to the main bearing unit. If the top according to the invention is designed as a soft top with a top cloth which, in the closed position of the top, bears under tension at least against the first and second surface bows, the abovementioned kinematic structure for the second surface bow affords the advantage that during opening and closing of the top, pivoting of the first and second surface bows does not result in overstretching of the fabric between a rear edge of the front bow and a front edge of the rear window. This effect is also assisted in that, during rearward pivoting of the main four-bar linkage, the second surface bow is displaced, inclined obliquely, below the first surface bow.

Expediently, one of the first supporting link and the second supporting link can be connected in an articulated manner to the main bearing unit by a control link which operates the one of the first supporting link and the second supporting link during pivoting of the main link mechanism with respect to the main bearing unit. Therefore, when the main link mechanism is pivoted about the main bearing unit, the second surface bow is also automatically displayed with respect to the first surface bow such that active control elements are not required for the second surface bow. The control link can expediently be coupled to the second supporting link adjacent to the joint between the second supporting link and the main link such that, during pivoting of the main link mechanism with respect to the main bearing unit, a torque is exerted on the second supporting link relative to the main link. This results in the explained, automatic displacing of the second surface bow.

The front bow can be displaced with respect to the main four-bar linkage in a space-saving manner by a front four-bar linkage having a front link and a rear link, wherein the front bow is fastened to the connecting bar of the front four-bar linkage or itself forms said connecting bar. A reduction in the number of components and automatic activation of the front four-bar linkage are obtained by the base of the front four-bar linkage being defined by a part of the main coupling member of the main four-bar linkage, which part is extended forward beyond a connecting joint of the main coupling bar and the main pillar, and by the rear link of the front four-bar linkage being defined by a part of the main pillar of the main four-bar linkage, which part is extended upward beyond the connecting joint to the coupling link. In other words, the main connecting member and the main pillar of the main four-bar linkage are respectively extended forward and upward beyond their connecting joint and therefore respectively form the base and the rear link of the front four-bar linkage.

A top according to a third aspect of the invention comprises a first top member, a second top member, and a driving link mechanism with a front driving lever and a rear driving lever, wherein the driving link mechanism is adapted to displace the first top member with respect to a vehicle body, wherein a first supporting link connects the second top member in an articulated manner to the front driving lever, wherein a second supporting link connects the second top member in an articulated manner to the rear driving lever, wherein at least one control bar is coupled to one of the first supporting link and the second supporting link, and wherein the at least one control bar is arranged outside the rear driving lever and the front driving lever.

A top according to a fourth aspect of the invention comprises a front bow, a first surface bow, a second surface bow, a main link mechanism being adapted to displace the front bow, the first surface bow and the second surface bow with respect to a body-mounted main bearing unit in order to open or to close the top, a first connecting link, a second connecting link defining a lowering lever, and a tensioning bow which is connected in an articulated manner to the lowering lever which is connected in an articulated manner to the main bearing unit, wherein the main link mechanism comprises a main pillar and a main link, commonly coupling the first surface bow to the main bearing unit, wherein, when the top is closed, the front bow, the first surface bow and the second surface bow cover an interior space of the convertible, wherein the first surface bow is arranged between the front bow and the second surface bow, wherein a first supporting link connects the second surface bow in an articulated manner to the main pillar, wherein a second supporting link connects the second surface bow in an articulated manner to the main link wherein the first connecting link is connected in an articulated manner to an end of the lowering-lever being opposite to the main bearing unit, and wherein the first connecting link is connected in an articulated manner to a rear window frame or a rear window.

It has to be understood that the features mentioned above and those which have yet to be explained below can be used not only in the respectively stated combination but also in different combinations or on their own without departing from the scope of the present invention.

It has to be understood that the links described in connection with the linkage systems above and those which have yet to be described below are designed as rigid lever type links.

BRIEF DESCRIPTION OF THE DRAWINGS

A preferred embodiment of the invention is illustrated schematically in the drawings and is described below in detail with reference to the drawings, in which.

DETAILED DESCRIPTION

A top according to the invention is explained in detail below with regard to an operating principle and the associated kinematic structure of the links in a preferred embodiment with reference to FIG. 1 to FIG. 11.

Figure 1:
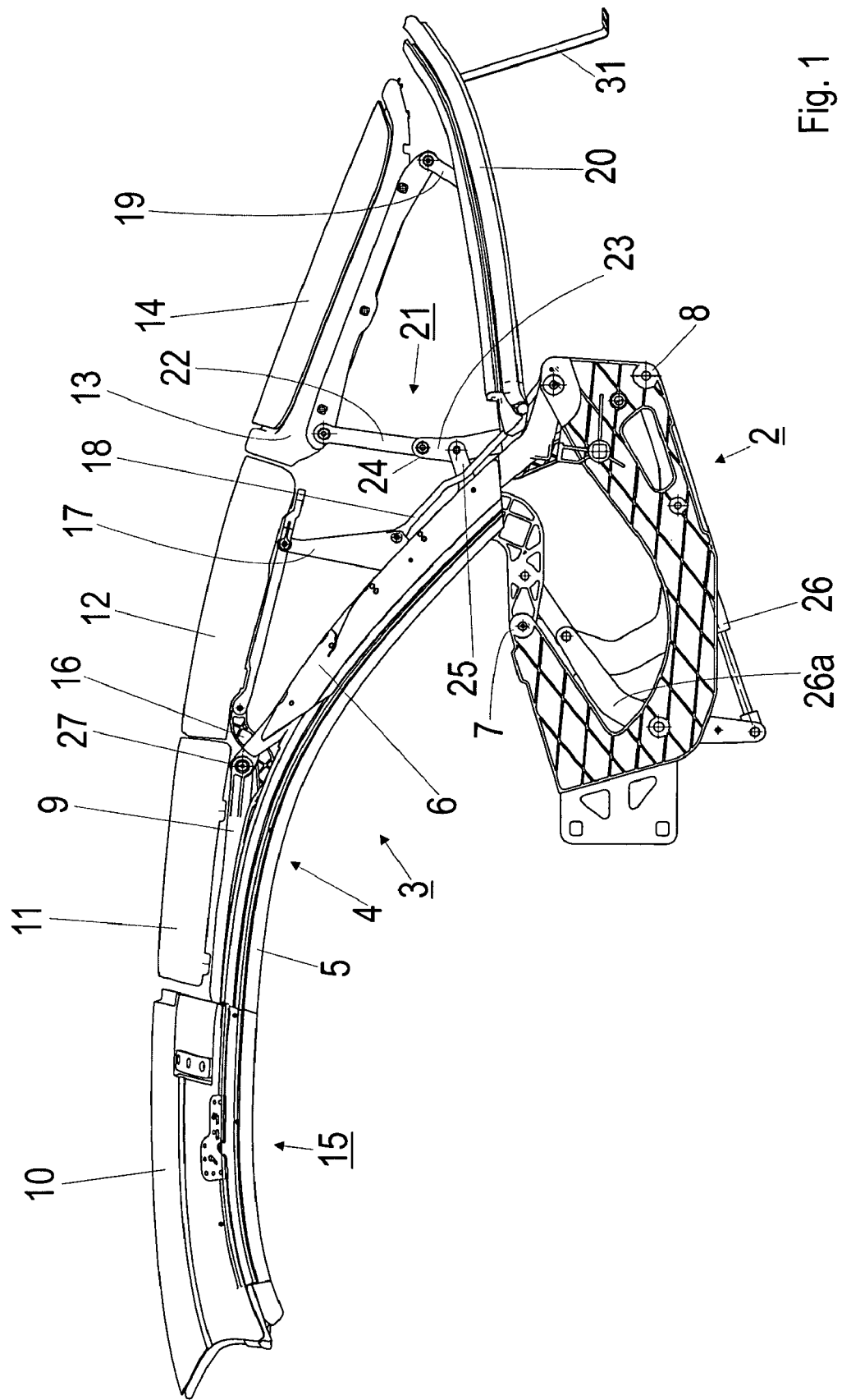
FIG. 1 shows a side view of a top according to the invention in its closed position.

FIG. 1 shows a top 1 according to the invention in a side view with its essential elements. A main bearing unit 2 to which a main link mechanism 3 is connected in an articulated manner is fastened in a vehicle body (not illustrated). The main link mechanism 3 is designed as a main four-bar linkage 4 which has a front link in the form of a "main pillar" 5 and a rear link in the form of a "main link" 6. The main pillar 5 and the main link 6 are coupled to the main bearing unit 2 via joint eyes 7, 8 and are connected to each other at their ends opposite the main bearing unit 2 by means of a coupling link 9.

The top 1 according to the invention comprises a front bow 10, a first surface bow 11, a second surface bow 12 and a rear window frame 13 in which a rear window 14 is arranged. The front bow 10 is connected to the main four-bar linkage 4 via a front four-bar linkage 15, which is explained in detail with reference to FIG. 6. The first surface bow 11 is fastened in a suitable manner to the coupling link 9. The second surface bow 12 is connected in an articulated manner to the main link mechanism by means of a first and second supporting link. The first supporting link 16 connects the front edge of the second surface bow 12 to the main pillar 5, and the second supporting link 17 connects the rear edge of the second surface bow 12 to the main link 6. A control link 18 connects the second supporting link 17 in an articulated manner to the main bearing unit 2 and serves to activate the second supporting link 17 when the main four-bar linkage 4 is pivoted relative to the main bearing unit 2.

The rear window frame 13 is connected in an articulated manner in the region of its rear edge by means of an auxiliary link 19 to a tensioning bow 20 which is connected in an articulated manner to the main bearing unit 2 by means of a four-bar linkage. The four-bar linkage for the tensioning bow 20 is explained in detail with reference to FIG. 9.

A chain of links 21 having a first and second connecting link 22, 23 which form an articulated connection to the main bearing unit 2 is provided at a front edge of the rear window frame 13. The first connecting link 22 here is coupled to the front edge of the rear window frame 13, wherein the second connecting link 23 is connected in an articulated manner to the main bearing unit 2. The two connecting links 22, 23 are connected in an articulated manner to each other by a joint 24. An intermediate link 25 is coupled to the main link 6 of the main four-bar linkage 4, which intermediate link is connected in an articulated manner by its opposite end to the second connecting link 23. The manner of operation of said intermediate link 25 is explained in detail with reference to FIG. 6.

In a departure from the illustration according to FIG. 1, the first connecting link 22 can be coupled to the rear window frame 13 further to the rear also at the lateral edge instead of at the front edge thereof, for example substantially in a central section of the side edge. The same also applies to the coupling of the first supporting link 16 to the second surface bow 12, according to which the first supporting link 16 can be coupled further to the rear at a side edge of the second surface bow 12. In a further modification of the illustration of FIG. 3, the first connecting link 22 can also be coupled directly to a rear window 14, a separate rear window frame not being required.

The second connecting link 23 is connected in an articulated manner not only to the first connecting link 22 but also therebelow to a free end 20a of the tensioning bow 20, at a free end thereof or at least adjacent thereto. The connecting joint of the second connecting link 23 with the tensioning bow 20 is therefore located between the joint 24 and its coupling to the main bearing unit 2. The second connecting link 23 takes on the function of a lowering lever with respect to the tensioning bow 20, and at the same time together with the first connecting link 22 forms a link mechanism in the form of a toggle lever mechanism, by means of which the rear window frame or rear window is connected in an articulated manner to the main bearing unit. The second connecting link therefore fulfills a dual function. In spite of its characteristic as a lowering link for the tensioning bow, the second connecting link 23 is always referred to below as such.

Figure 11:
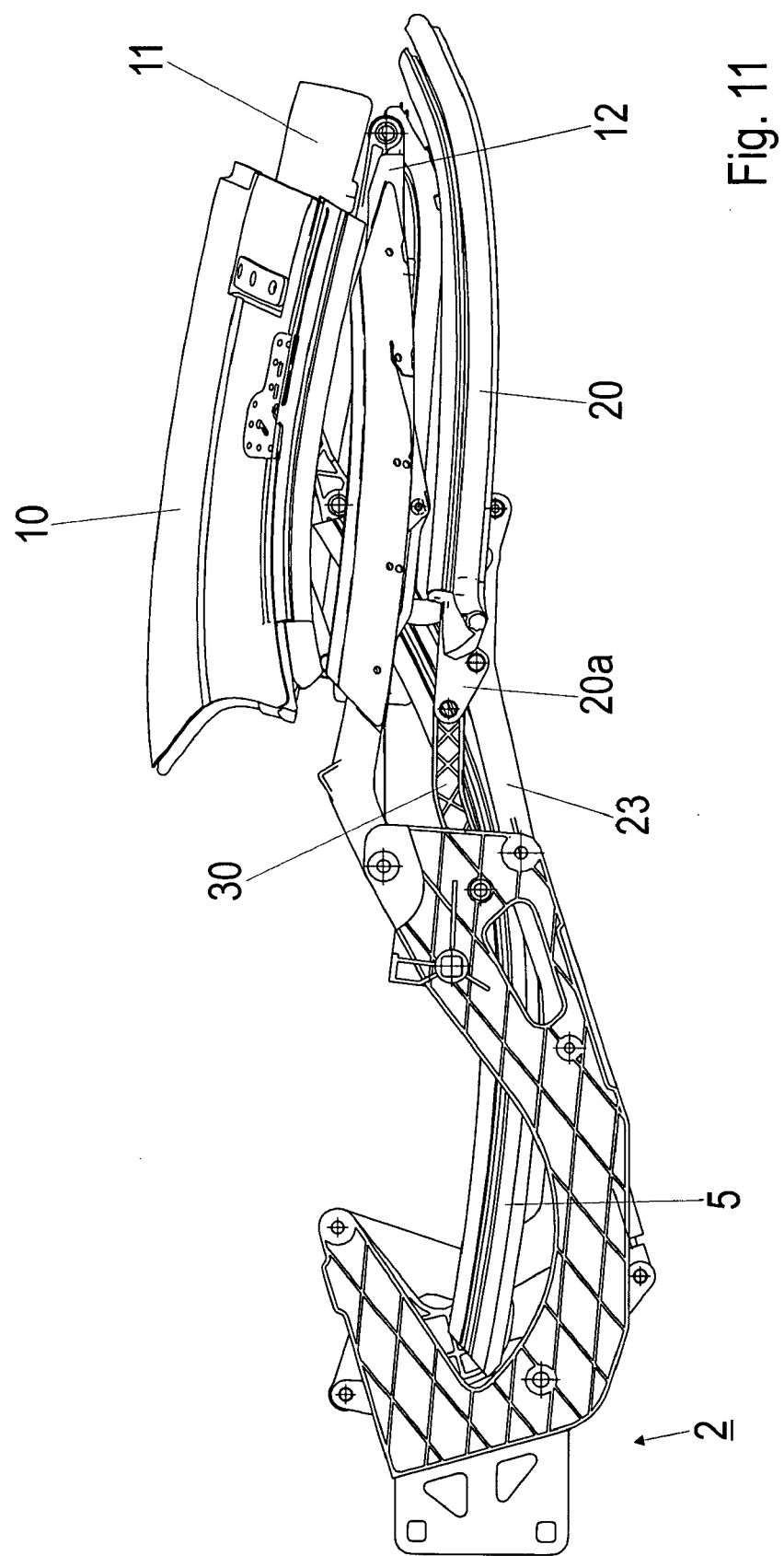
FIG. 11 shows a lateral sectional view of the top according to the invention in its completely open position.

A further link in the form of an additional link 30 which is connected in an articulated manner to the main bearing unit 2 is coupled to a free end 20a of the tensioning bow (cf. FIG. 11 too). The additional link 30 and the second connecting link 23 are connected in an articulated manner adjacent to each other to the free end 20a of the tensioning bow 20, wherein said two links form part of a four-bar linkage, the base of which is formed by the main bearing unit 2 and the connecting rod of which is formed by the free end 20a of the tensioning bow 20. Said four-bar linkage is activated by the lowering lever in the form of the second connecting link 23 which is connected in an articulated manner to the main pillar 6 of the main four-bar linkage 4 by means of an intermediate link 25. The top 1 is shown in a side view in FIG. 1. In this regard, it goes without saying that the abovementioned link elements are provided in each case on both sides of the individual roof bows. For simplification and to avoid repetitions, the link elements are only shown once and only explained once in the respective lateral sectional views.

A driving device 26 in the form of a hydraulic cylinder which drives the main pillar 5 via a link mechanism 26a is mounted on the main bearing unit 2. By actuation of the hydraulic cylinder 26, the main four-bar linkage 4 can be pivoted with respect to the main bearing unit 2 in order to open or to close the top 1.

Figure 2:
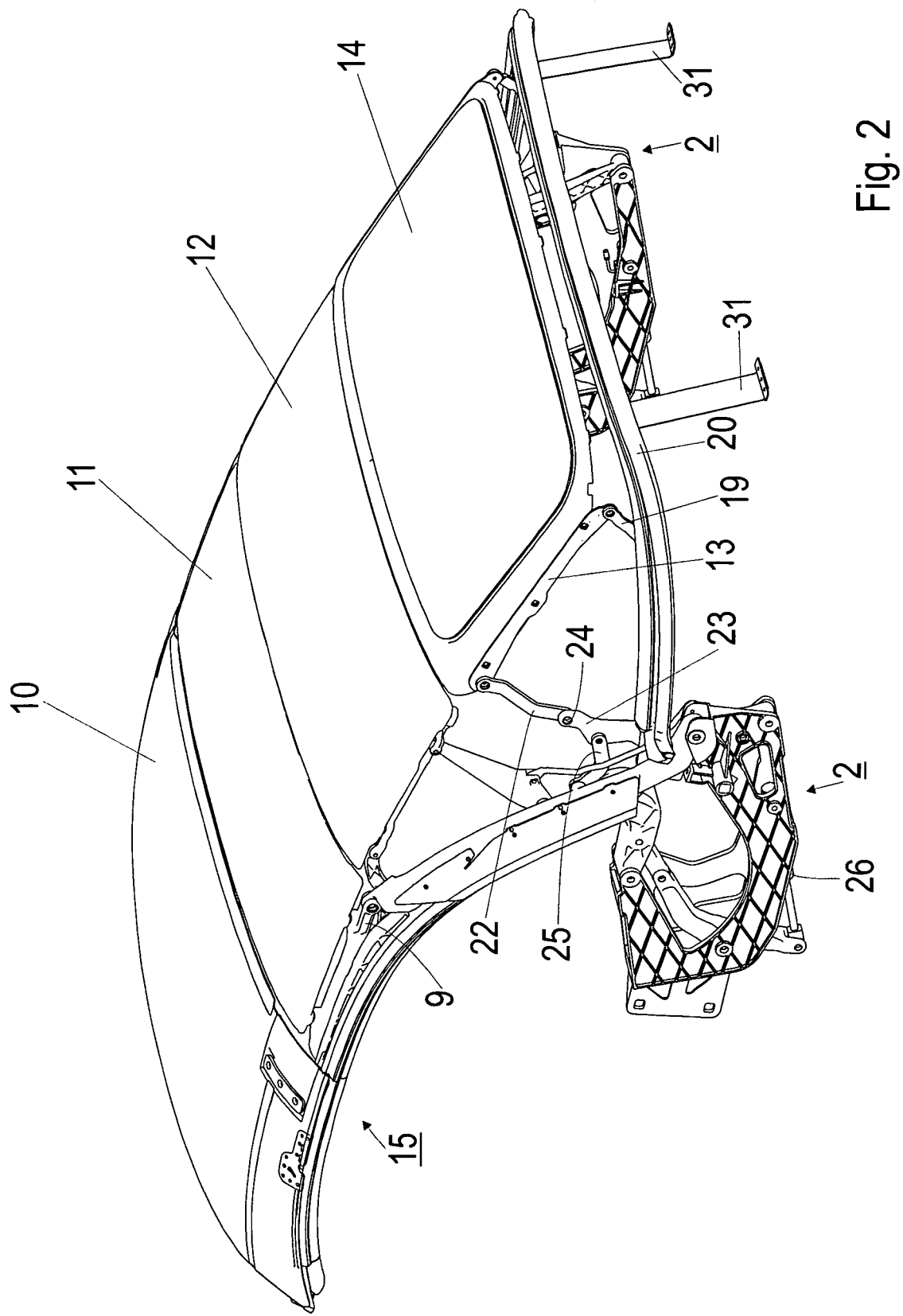
FIG. 2 shows a perspective view from the rear on the left of the top from FIG. 1.
Figure 3:
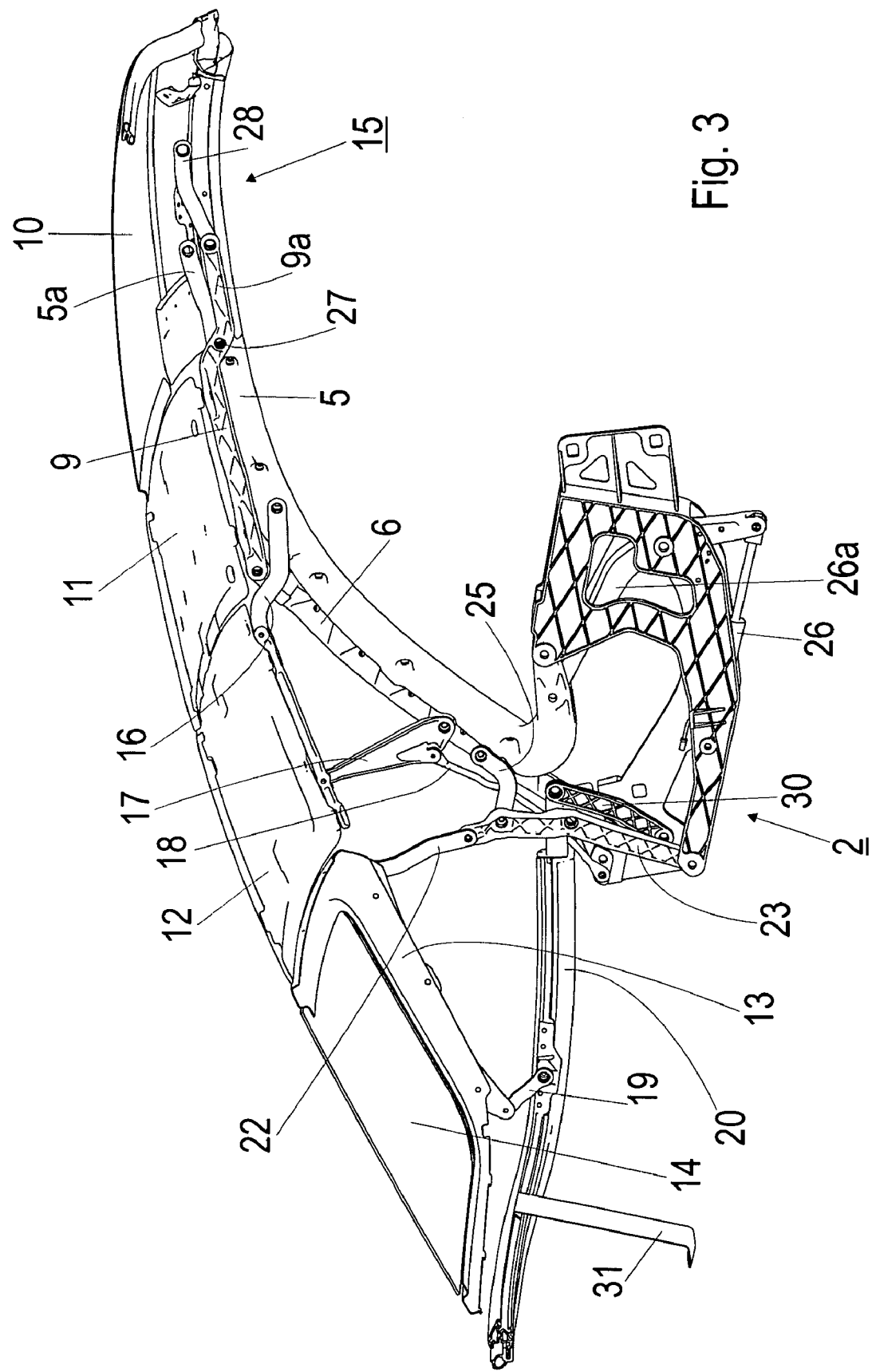
FIG. 3 shows a perspective view from the inside on the right at the front of the top from FIG. 1.

FIG. 2 and FIG. 3 show the top 1 perspectively in its closed position, from obliquely at the rear on the left (FIG. 2) and from the inside on the right at the front (FIG. 3). In this closed position, the front bow 10 is arranged right at the front and is locked to a cowl (not shown) or upper edge of a windshield frame in a suitable manner. The first surface bow 11 is accommodated between the front bow 10 and the second surface bow 12. The rear window frame 13 is shifted upward with respect to the tensioning bow 20 to such an extent that its front edge ends substantially flush with a rear edge of the second surface bow 12. At least one tensioning strap 31 is fastened to the tensioning bow 20, said tensioning strap being completely tensioned in the closed position of the top 1 and preventing a further upward displacing of the tensioning bow 20. When the tensioning bow 20 is lowered out of the position according to FIG. 1 or FIG. 2, the tensioning strap 31 becomes slack and therefore also permits a translatory displacement of the tensioning bow 20 in order, in an embodiment of the top 1 as a soft top, to suitably relieve the top cloth, which is fastened to the tensioning bow 20, from load.

In the closed position of the top 1, the tensioning bow 20 is located below a top compartment cover (not shown), with a seal or the like being fitted to a lower side of the tensioning bow 20, said seal being in contact with a vehicle body region and ensuring sealing of the vehicle interior space to the outside. As an alternative, in the closed position of the top 1, the tensioning bow can also be arranged above a top compartment cover.

The perspective view of FIG. 2 clarifies that the main bearing unit 2 is provided in each case on the left-hand and on the right-hand edge of the vehicle body. By means of the arrangement of the link elements on both sides of the respective roof bows, precise pivoting and displacing relative to the vehicle body are ensured.

The top 1 according to the invention can be designed both as a hard top and as a soft top. In the embodiment of a hard top, the individual roof bows form dimensionally rigid roof shells of the top, with suitable seals S being provided at the roof-bow edges which run parallel to the transverse axis of the vehicle such that the roof bows, when their edges each end flush with one another, close and seal the vehicle interior space to the outside. In the embodiment of a soft top, a top cloth can be provided, said top cloth, in the closed position of the top, bearing under tension from the outside against the first and second surface bows. The top cloth is fastened on the rear side to the tensioning bow 20 and runs laterally as far as the side window seal. In this case, the region between the rear window 14 and tensioning bow 20 is covered by the top cloth. At its opposite end, the top cloth can be fastened either to a rear edge of the front bow, or can be stretched completely over the front bow and fastened to the front edge thereof. An embodiment of the top as a soft top is explained in detail with reference to FIGS. 9 and 10.

FIG. 3 shows the top 1 in the closed state perspectively from the inside on the right at the front. It can be seen that the control link 18 is coupled by its two ends to the second supporting link 17 and to the main bearing unit 2. Furthermore, the perspective view according to FIG. 3 illustrates the construction of the front four-bar linkage 15, by means of which the front bow 10 is connected to the main link mechanism 3. The coupling link 9 is extended forward in the direction of the front bow 10 via the joint 27, by means of which it is connected in an articulated manner to the main pillar 5, wherein said front part 9*a* of the coupling link 9 forms the base of the front four-bar linkage 15. The main pillar 5 is likewise extended beyond the joint 27 in the direction of the front bow 10 and, together with said front part 5*a*, forms a rear link of the front four-bar linkage 15. A further link 28 which is connected in an articulated manner by its opposite end to the front bow 10 is coupled to the free end of the front part 9*a* of the coupling link 9. In this case, the front bow 10 itself forms the connecting bar of the front four-bar linkage 15. Since the coupling link 9 and the main pillar 5 of the main four-bar linkage 4 are extended forward beyond the joint 27, the number of components required for the front four-bar linkage 15 can be reduced and at the same time automatic activation for the front four-bar linkage 15 can be obtained.

Figure 4:
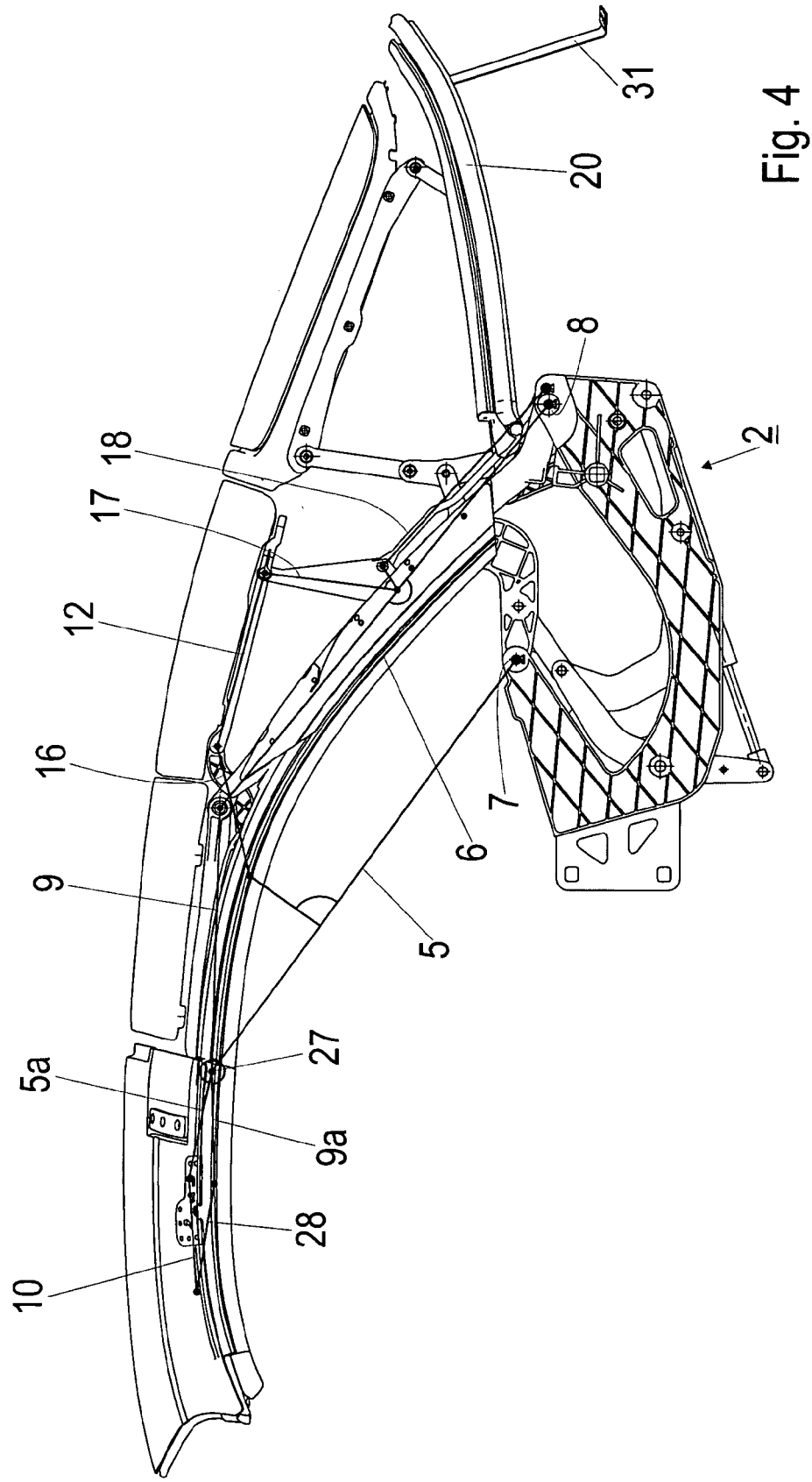
FIG. 4 shows a side view of the top analogously to FIG. 1, with essential link elements of the top additionally being illustrated by means of lines.
Figure 5:
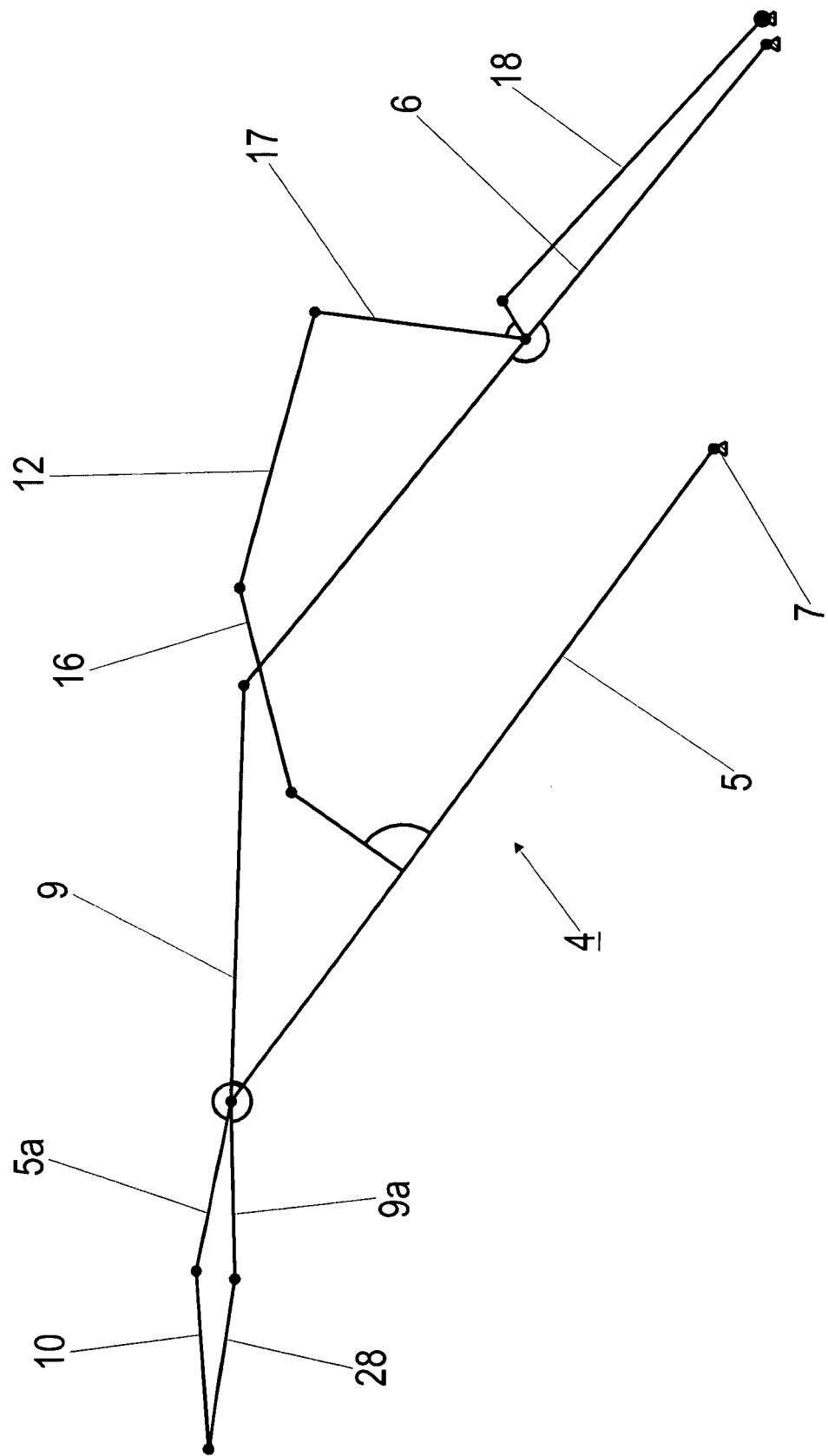
FIG. 5 shows a simplified bar link model for the top in its position according to FIG. 1.

To better understand the above-explained kinematic structure of the links of the top 1, the essential link elements are additionally indicated by bar elements in the side view according to FIG. 4. Analogously thereto, the kinematic structure of the links is illustrated in FIG. 5 solely by means of bar elements. For simplification purposes, the rear window frame 13 and the tensioning bow 20 are not shown in FIG. 5.

Pivoting of the main four-bar linkage 4 rearward with respect to the main bearing unit 2, with the top 1 being transferred as a result into its open position, is explained below with reference to FIG. 6 to FIG. 8.

Figure 6:
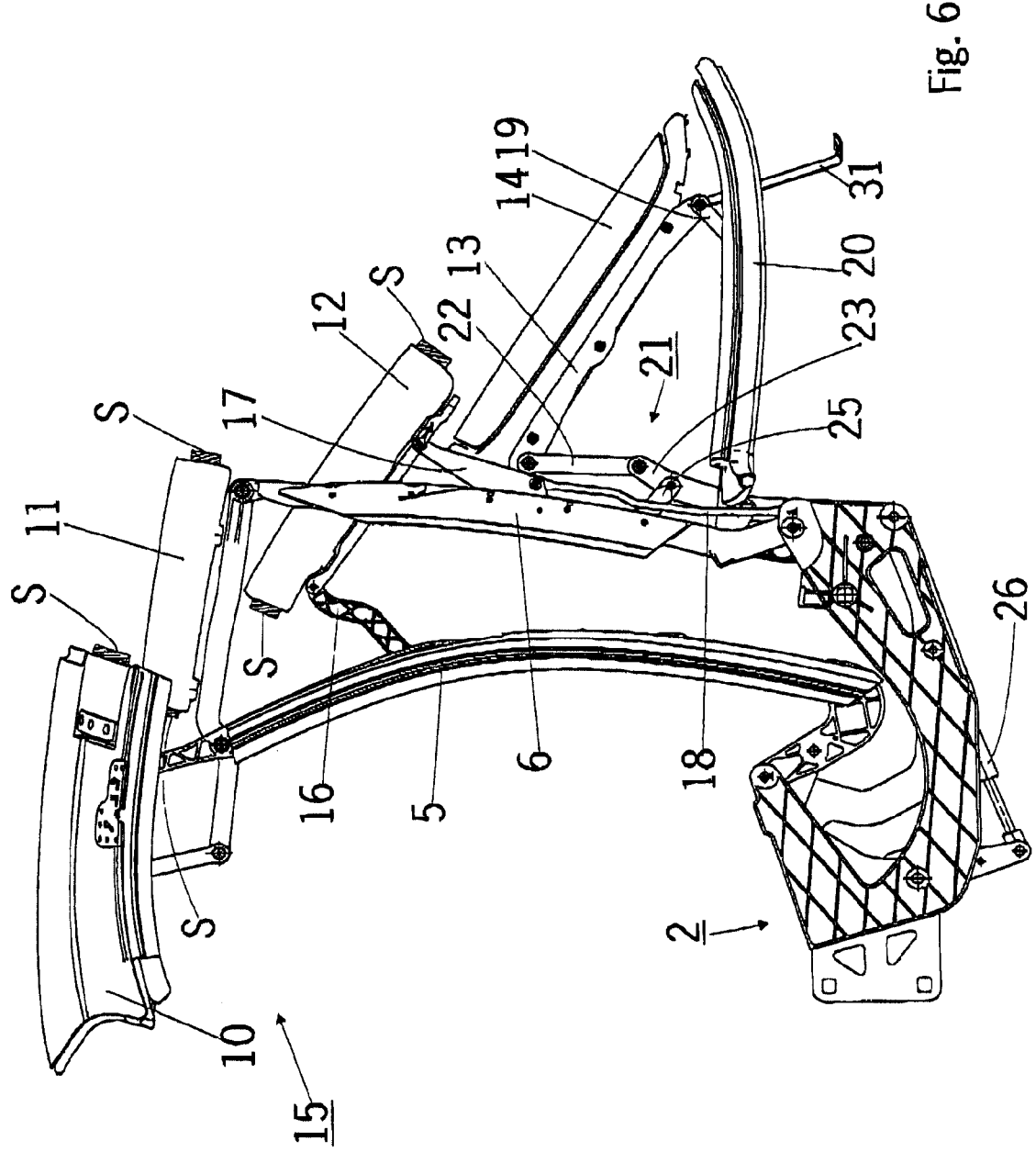
FIG. 6 shows a side view of the top from FIG. 1 in a semi-open position.

Starting from the closed position of the top 1, by actuation of the hydraulic cylinder 26, the control bar of which is connected to the main pillar 5 via additional driving levers, the main four-bar linkage 4 is pivoted rearward, i.e. to the right with respect to the main bearing unit 2 in FIG. 6. As a consequence of the articulated connection of the main pillar 5 to the main link 6 by means of the coupling link 9, the main link 6 is also automatically pivoted with respect to the main bearing unit 2 during activation and driving of the main pillar 5. The front four-bar linkage 15 is designed with respect to its kinematic structure in such a manner that, during pivoting of the main four-bar linkage 4 to the rear, or to the right in FIG. 6, the first surface bow 11, which is fastened to the coupling link 9, is shifted under the front bow 10. At the same time, the control link 18 exerts a torque on the second supporting link 17 such that the second supporting link 17 is pivoted in the anticlockwise direction relative to the main link 6 to which it is coupled. This has the consequence that the second surface bow 12 is transferred into an inclined oblique position, with the second surface bow 12 being shifted forward in the direction of travel below the first surface bow 11. The coupling of the second surface bow 12 to the main pillar 5 and the main link 6 by means of the first and second supporting link 16, 17 ensures a play-free and flapping-free displacing of the second surface bow 12 with respect to its roof elements which are adjacent thereto.

The rearward pivoting of the main link 6 also has an effect on the chain of links 21 by means of the intermediate link 25. Since the intermediate link 25 presses the second connecting link 23 downward in the direction of the tensioning bow 20, the chain of links 21 in the form of a toggle lever is shifted to the rear and, as a result, the front edge of the rear window frame 13 is lowered downward in the direction of the tensioning bow 20.

Figure 7:
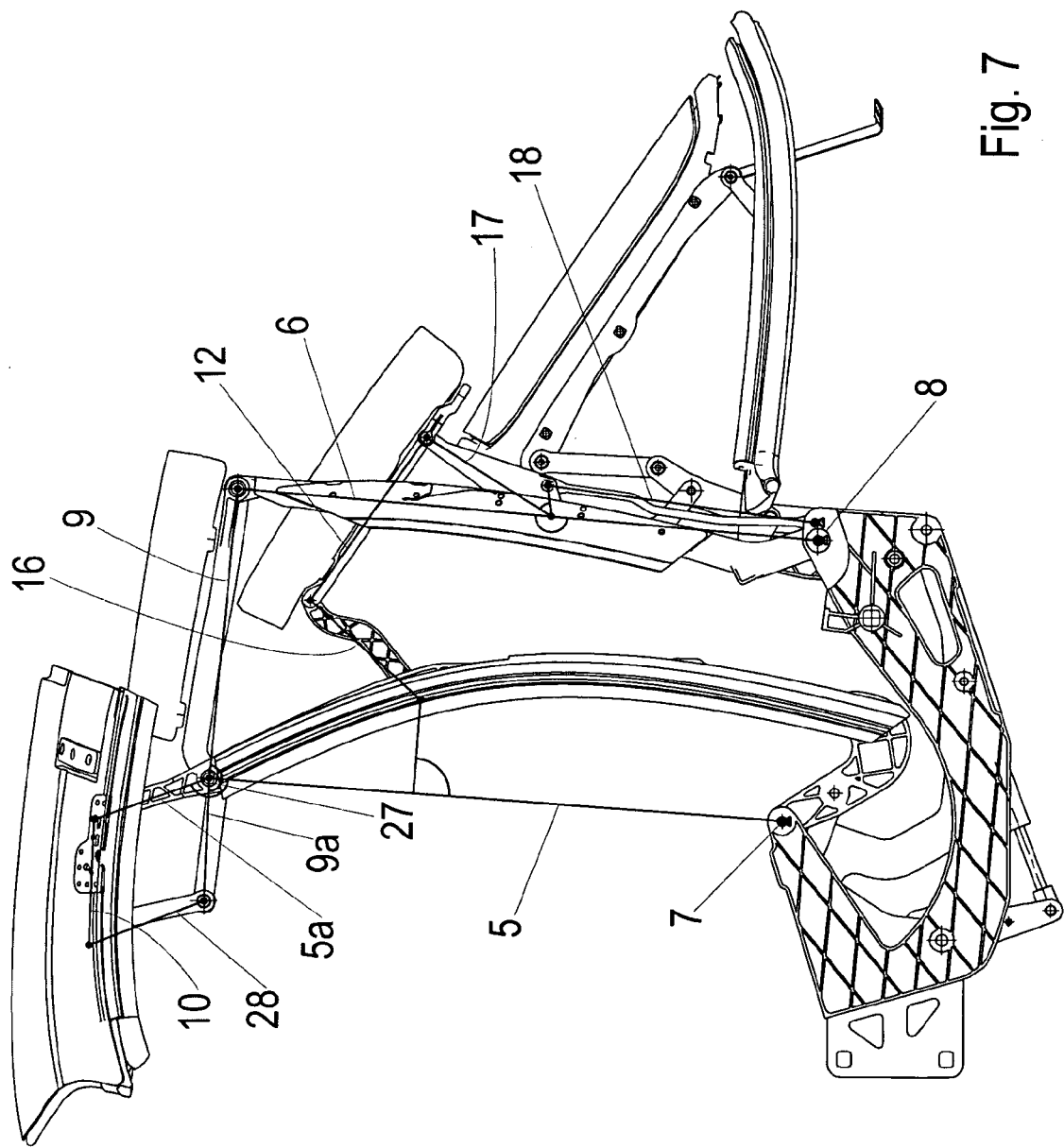
FIG. 7 shows a side view of the top from FIG. 6, with essential link elements of the top additionally being illustrated by means of lines.
Figure 8:
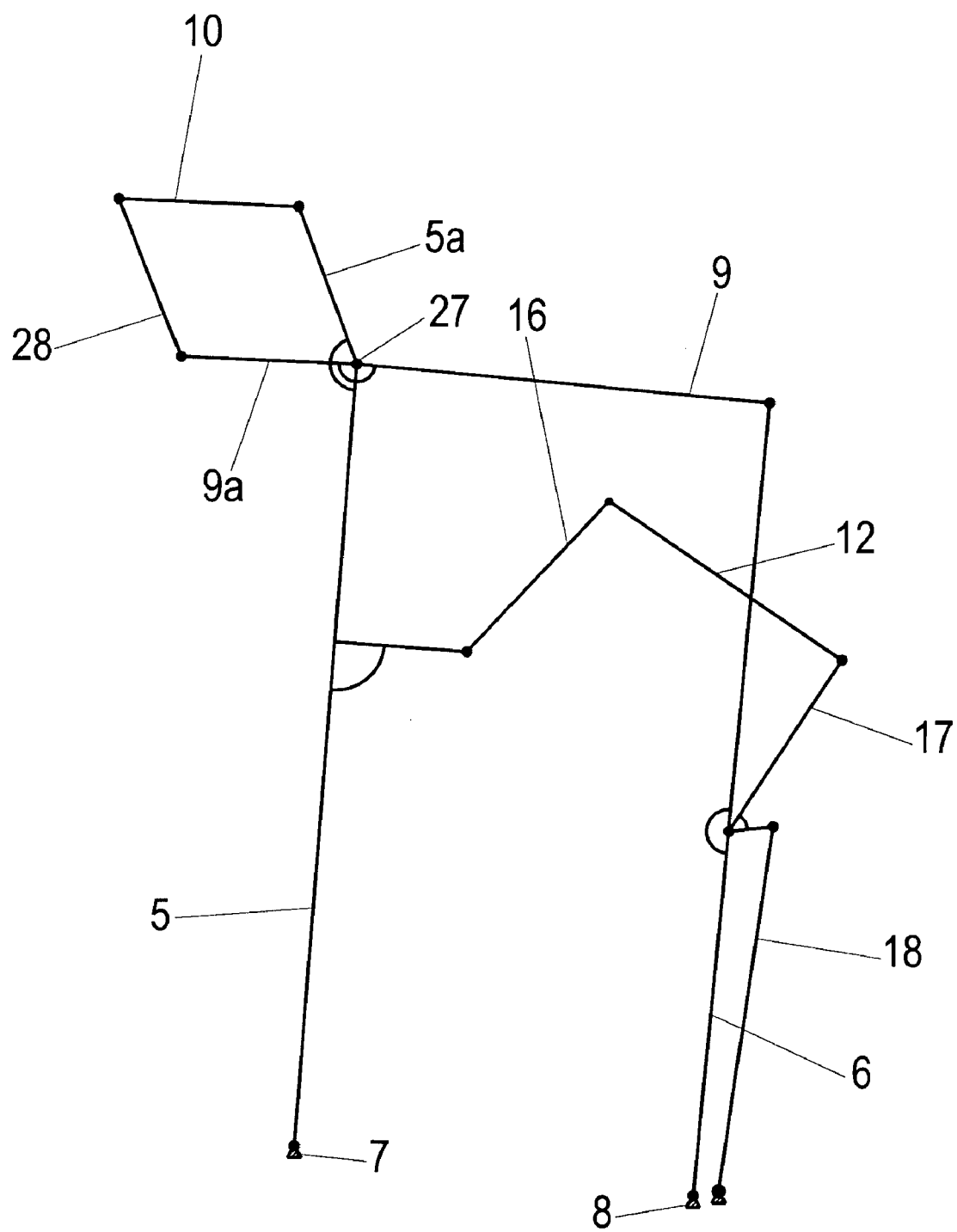
FIG. 8 shows a simplified bar link model of the top according to the invention in its position according to FIG. 7.

FIG. 7 shows the top 1 in a side view analogously to FIG. 6, wherein the essential link elements are additionally indicated by bar elements for better understanding. The position of the top 1 according to FIG. 6 and FIG. 7 is shown once again in FIG. 8 in a simplified bar-element illustration, with, for the purpose of simplification, the rear window frame 13 and the tensioning bow 20 not being shown.

Figure 9:
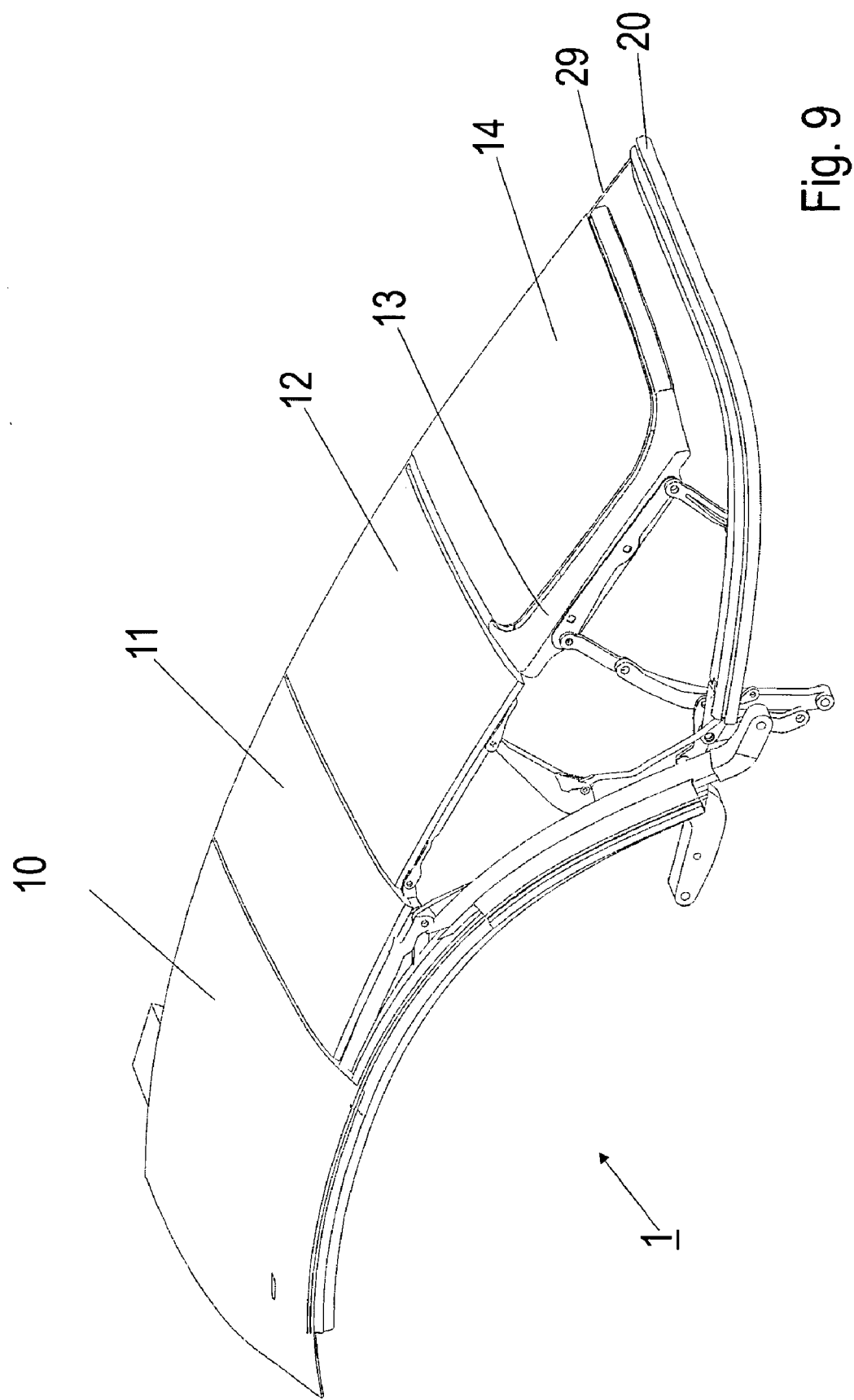
FIG. 9 shows a perspective view of the top in its closed position from obliquely at the rear on the left in an embodiment as a soft top.
Figure 10:
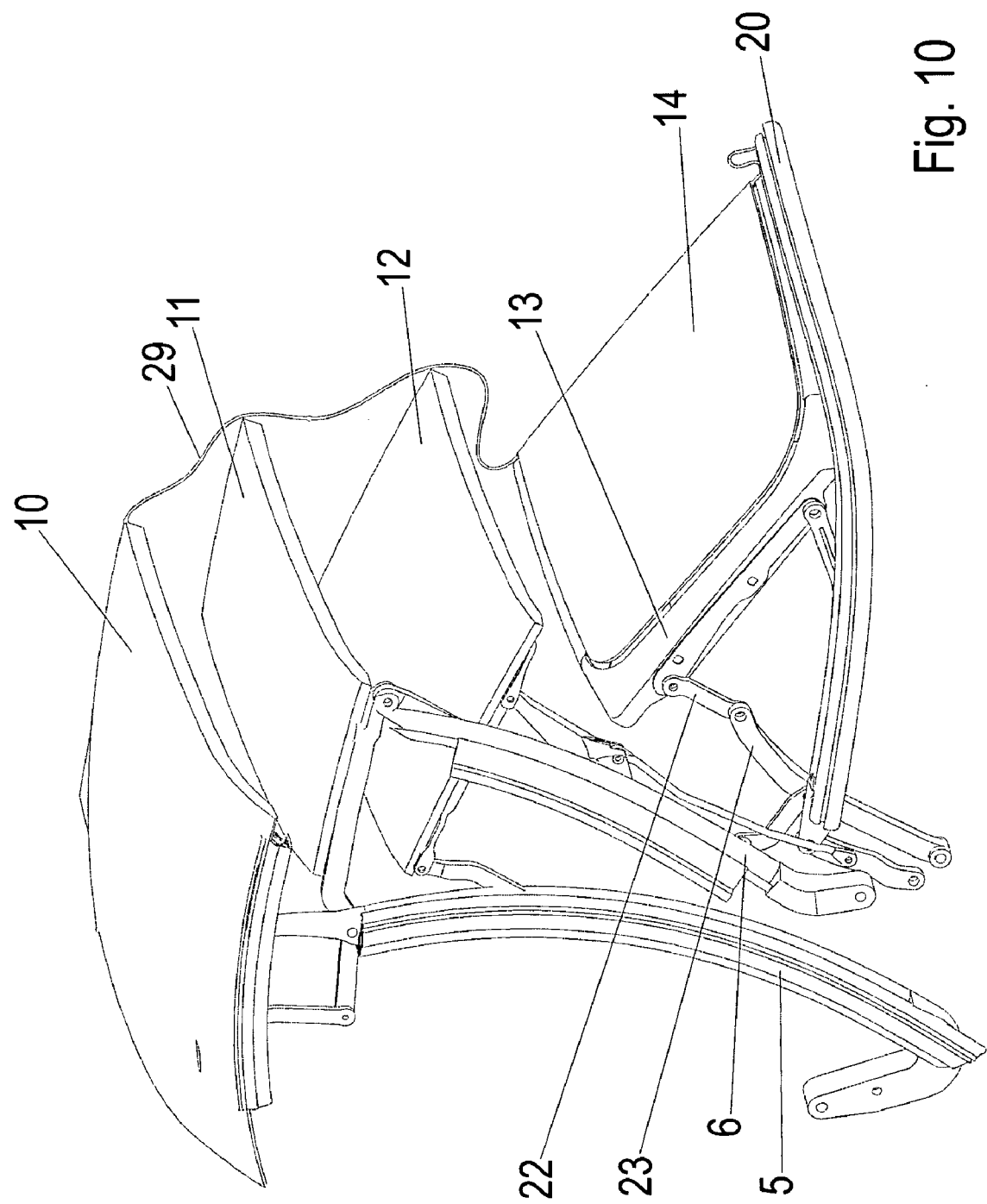
FIG. 10 shows a perspective view of the top from FIG. 9, in a semi-open position.

FIG. 9 and FIG. 10 illustrate the top 1 in the embodiment of a soft top, wherein, in the closed position of the top 1 (FIG. 9), an associated top cloth 29 bears under tension from the outside against the first and second surface bows 11, 12 and, during opening of the top 1, is correspondingly relaxed. The kinematic structure with respect to the first surface bow 11 and in particular the second surface bow 12 is designed in such a manner that, during opening of the top 1, when the main four-bar linkage 4 is pivoted rearward with respect to the main bearing unit 2, the free length between a rear edge of the front bow 10 and a front edge of the rear window 14, to which the top cloth 29 is fastened, is not exceeded by the first and second surface bows 11, 12. In other words, during opening of the top 1, the first and second surface bows 11, 12 pivot merely within said free length, as a result of which there is no overstretching of the fabric of the top cloth 29. As can be seen in FIG. 10, the top cloth 29 is fastened to the rear-edge of the front bow 10 and to the tensioning bow 20, with the top cloth 29 additionally being fastened between the rear window 14 and the side edges of the rear window frame 13. Nevertheless, the top cloth 29 with the first and second surface bows 11, 12 cannot be fastened to the outer surface thereof, and therefore, in the closed position of the top 1, the above-explained resting of the top cloth 29 on said surface bows 11, 12 under tension occurs.

FIG. 11 shows the top 1 in its completely open position when it is stowed in a rear top compartment or the like. In this position, the front bow 10, the first surface bow 11 and the second surface bow 12 are arranged one above the other in the same direction or curved in the same manner and rest from above on the rear window frame 13 which is positioned substantially parallel to the tensioning bow 20. The tensioning bow 20 is connected in an articulated manner to the main bearing unit 2 by means of a four-bar linkage. For this purpose, the tensioning bow 20 is connected in an articulated manner by its free end 20*a*, which is adjacent to the main bearing unit 2, to a lower part of the second connecting link 23. Said lower part of the second connecting link 23 therefore forms a rear link for the four-bar linkage of the tensioning bow 20. A further link 30 which is connected by its opposite end in an articulated manner to the main bearing unit 2 is coupled to the free end 20*a* of the tensioning bow 20. The main bearing unit 2 therefore forms a base and the free end 20a, which is designed in the form of a triangular plate, forms a connecting rod for the above-explained four-bar linkage of the tensioning bow 20.

The four-bar linkage for the tensioning bow is activated via the second connecting link 23 which is connected in an articulated manner to the main link 6 by the intermediate link 25. During pivoting of the main link 6 with respect to the main bearing unit 2, the second connecting link 23 is also pivoted with respect to the main bearing unit 2 by means of the intermediate link 25, as a result of which the tensioning bow 20 is displaced in a translatory manner substantially parallel to the longitudinal axis of the vehicle.

By means of the provision of a first and second surface bow 11, 12, which, in the closed position of the top 1, are arranged between the front bow 10 and the rear window frame 13, the top 1 takes up a comparatively little amount of construction space in its stowed position according to FIG. 11, since the individual surface bows 11, 12, viewed on their own, have a comparatively small length in the longitudinal direction of the vehicle. Accordingly, the front bow 10 and the rear window frame 13 can also be of comparatively short design with respect to their longitudinal extent, with it being possible, by means of the consecutive arrangement of the respective roof elements, i.e. front bow 10, first and second surface bows 11, 12 and rear window frame 13, for even four-seater convertibles to be suitably covered in the closed position of the top.

A single driving device, for example in the form of the hydraulic cylinder 26, suffices for driving the top 1. The front four-bar linkage 15, the first and second supporting links 16, 17 and the articulated connection of the rear window frame 13 to the tensioning bow 20 taking the intermediate link 25 into consideration ensure a synchronous and trouble-free pivoting of the front bow 10, the second surface bow 12 and the rear window 14 with respect to the main four-bar linkage 4 in order to transfer the top 1 between the closed position according to FIG. 1 and the open position according to FIG. 9.

Starting from the open position according to FIG. 11, the top 1 can be shifted by renewed actuation of the hydraulic cylinder 26 in the opposite direction via the intermediate position according to FIG. 6 back into its closed position according to FIG. 1.

The first and second surface bows 11, 12 can also be activated by other suitable relative movements within the main link mechanism, thus enabling the construction space to be improved. Such alternative activations with respect to the first and second surface bows are possible in every kinematic structure as long as a pivoting of the first surface bow 11 and in particular of the second surface bow 12 within the free length between the rear edge of the front bow 10 and the front edge of the rear window 14 is ensured.

What is claimed is:

1. A top for a convertible, comprising a front bow,
a first surface bow, a second surface bow, and
a main link mechanism being adapted to displace the front bow, the first surface bow and the second surface bow with respect to a body-mounted main bearing unit in order to open or to close the top,
wherein the main link mechanism comprises a main pillar and a main link,
wherein, when the top is closed, the front bow, the first surface bow and the second surface bow cover an interior space of the convertible, wherein the first surface bow is arranged between the front bow and the second surface bow,
wherein exactly one first supporting link connects the second surface bow in an articulated manner to the main pillar, and
wherein exactly one second supporting link connects the second surface bow in an articulated manner to the main link.

2. The top as claimed in claim 1, wherein the main link mechanism is designed as a main four-bar linkage comprising the main pillar as a front link and the main link as a rear link.

3. The top as claimed in claim 2, wherein the first surface bow is fastened to a coupling link of the main four-bar linkage.

4. The top as claimed in claim 1, wherein one of the first supporting link and the second supporting link is coupled to a portion of the second surface bow located in the vicinity of a front edge of the second surface bow, and wherein the other of the first supporting link and the second supporting link is coupled to a portion of the second surface bow located in the vicinity of a rear edge of the second surface bow.

5. The top as claimed in claim 4, wherein, during opening of the top from a closed state of the top, the second surface bow can be displaced below the first surface bow and in a direction toward the first surface bow.

6. The top as claimed in claim 1, wherein a control link is assigned to one of the first supporting link and the second supporting link, the control link being connected in an articulated manner to the main bearing unit such that said one of the first supporting link and the second supporting link is operated by said control link during a pivot movement of the main link mechanism with respect to the main bearing unit.

7. The top as claimed in claim 6, wherein the control link is pivotably coupled to the second supporting link such that, during pivoting of the main link mechanism with respect to the main bearing unit, a torque is exerted on the second supporting link relative to the main link.

8. The top as claimed in claim 1, further comprising a front four-bar linkage comprising a front link, a rear link and a connecting bar, wherein the front bow is assigned to the connecting bar of the front four-bar linkage, and wherein the front four-bar linkage is adapted to displace the front bow with respect to the main link mechanism.

9. The top as claimed in claim 8, wherein the main link mechanism is designed as a main four-bar linkage comprising the main pillar, the main link and a coupling link, wherein the front four-bar linkage further comprises a base, the base and the rear link of the front four-bar linkage respectively being an extension of the main coupling member and of the main pillar of the main four-bar linkage.

10. The top as claimed in claim 1, comprising a tensioning bow and a rear window frame in which a rear window is arranged, wherein the rear window frame is connected in an articulated manner to the tensioning bow.

11. The top as claimed in claim 10, further comprising an auxiliary link, wherein the auxiliary link connects a rear edge of the rear window frame in an articulated manner to the tensioning bow.

12. The top as claimed in claim 10, further comprising a chain of links, wherein the chain of links connects a front edge of the rear window frame in an articulated manner to the main bearing unit.

13. The top as claimed in claim 12, wherein the main link mechanism is adapted to operate the chain of links.

14. The top as claimed in claim 12, wherein the chain of links comprises a first connecting link and a second connecting link, the first connecting link and the second connecting link being connected in an articulated manner to each other such that the first connecting link has a first free end and the second connecting link has a second free end, wherein the first free end of the first connecting link is connected in an articulated manner to the front edge of the rear window frame, and wherein the second free end of the second connecting link is connected in an articulated manner to the main bearing unit.

15. The top as claimed in claim 14, further comprising an intermediate link, wherein the intermediate link connects the main link of the main link mechanism in an articulated manner to one of the first connecting link and the second connecting link such that, during pivoting of the main link mechanism with respect to the main bearing unit, the rear window frame is displaced with respect to the tensioning bow, wherein, in a closed position of the top, the front edge of the rear window frame substantially abuts to a rear edge of the second surface bow, and wherein, in a stowed position of the top, the rear window frame is stowed above the tensioning bow substantially parallel thereto.

16. The top as claimed in claim 10, further comprising a four-bar linkage connecting the tensioning bow in an articulated manner to the main bearing unit, wherein the four-bar linkage comprises a base defined by the main bearing unit, a connecting rod defined by a first end of the tensioning bow, which first end is adjacent to the main bearing unit, and a front link and a rear link connecting the base and the connecting rod in an articulated manner.

17. The top as claimed in claim 16, further comprising a chain of links, wherein the chain of links connects a front edge of the rear window frame in an articulated manner to the main bearing unit, wherein the chain of links comprises a first connecting link and a second connecting link, the first connecting link and the second connecting link being connected in an articulated manner to each other such that the first connecting link has a first free end and the second connecting link has a second free end, wherein the first free end of the first connecting link is connected in an articulated manner to the front edge of the rear window frame, and wherein the second free end of the second connecting link is connected in an articulated manner to the main bearing unit, and wherein the rear link is defined by a lower part of the second connecting link.

18. The top as claimed in claim 10, wherein the second surface bow is displaceable above the rear window frame.

19. The top as claimed in claim 1, wherein, in the closed position of the top, respectively outwardly directed outer surfaces of the front bow, of the first surface bow and of the second surface bow together define an outer surface of the convertible, wherein the longitudinal sides of the front bow, of the first surface bow and of the second surface bow have suitable seals which, in the closed position of the top, come into contact with a corresponding sealing surface of an adjacent of said bows such that sealing of the interior space of the vehicle to the outside is ensured.

20. The top as claimed in claim 1, comprising a top cloth which, in the closed position of the top, spans at least the first surface bow and the second surface bow.

21. A top for a convertible, comprising
a front bow,
a main link mechanism being adapted to displace the front bow with respect to a body-mounted main bearing unit in order to open or to close the top,
a first connecting link,
a second connecting link defining a lowering lever,
a tensioning bow which is connected in an articulated manner to the lowering lever which is connected in an articulated manner to the main bearing unit,
wherein the first connecting link is connected in an articulated manner to an end of the lowering lever being opposite to the main bearing unit, and wherein the first connecting link is connected in an articulated manner to one of a rear window frame and a rear window.

22. The top as claimed in claim 21, wherein the main link mechanism is adapted to operate the lowering lever.

23. The top as claimed in claim 22, further comprising an intermediate link being connected in an articulated manner at a first end to a link of the main link mechanism and at a second end to one of the lowering lever and the first connecting link such that pivoting of the main link mechanism with respect to the main bearing unit results in pivoting of the lowering lever with respect to the main bearing unit.

24. The top as claimed in claim 21, wherein the tensioning bow is connected in an articulated manner to an additional link being connected in an articulated manner to the main bearing unit, wherein the lowering lever and the additional link respectively define links of a four-bar linkage comprising a base and a connecting rod, the base being defined by the main bearing unit and the connecting rod being defined by a free end of the tensioning bow.

25. The top as claimed in claim 24, wherein the lowering lever and the additional link are respectively coupled to the free end of the tensioning bow adjacent to each other.

26. The top as claimed in claim 21, wherein the lowering lever and the tension bow comprise a connecting joint, the lowering lever extending with a free end beyond the connecting joint in a direction towards one of the rear window frame and the rear window, and wherein the free end is connected in an articulated manner to the first connecting link.

27. The top as claimed in claim 21, wherein the main link mechanism is designed as a main four-bar linkage comprising the main pillar and the main link.

28. The top as claimed in claim 21, further comprising a first surface bow and a second surface bow, the second surface bow being connected in an articulated manner to the main link mechanism, wherein, when the top is closed, the first surface bow is arranged between the front bow and the second surface bow.

29. The top as claimed in claim 28, wherein the main link mechanism is designed as a main four-bar linkage comprising the front pillar, the main link and a main coupling member, and wherein the first surface bow is fastened to the main coupling member.

30. The top as claimed in claim 28, wherein a first supporting link connects the second surface bow in an articulated manner to the main pillar and wherein a second supporting link connects the second surface bow in an articulated manner to the main link.

31. The top as claimed in claim 21, further comprising an auxiliary link, wherein the auxiliary link connects a rear edge of one of the rear window frame and the rear window in an articulated manner to the tensioning bow.

32. The top as claimed in claim 21, wherein the first connecting link is coupled to a portion of one of the rear window frame and the rear window.

33. A top for a convertible vehicle, comprising
a first top member,
a second top member, and
a driving link mechanism with a front driving lever and a rear driving lever,
wherein the driving link mechanism is adapted to displace the first top member with respect to a vehicle body,
wherein a first supporting link is connected to the second top member in an articulated manner and to the front driving lever in an articulated manner, wherein a second supporting link is connected to the second top member in an articulated manner and to the rear driving lever in an articulated manner, wherein at least one control bar is coupled to one of the first supporting link and the second supporting link, and wherein the at least one control bar is arranged outside the rear driving lever and the front driving lever.

34. The top as claimed in claim 33, wherein the at least one control bar is coupled to a body-mounted part, and wherein the driving link mechanism is designed as a four-bar linkage with the second top member as connecting member commonly operated by said front driving lever and said rear driving lever.

35. The top as claimed in claim 33, wherein at least one of the first top member and the second top member is designed as rigid surface bow of a retractable hard top.

36. A top for a convertible, comprising
a front bow,
a first surface bow,
a second surface bow,
a main link mechanism being adapted to displace the front bow, the first surface bow and the second surface bow with respect to a body-mounted main bearing unit in order to open or to close the top,
a first connecting link,
a second connecting link defining a lowering lever, and
a tensioning bow which is connected in an articulated manner to the lowering lever which is connected in an articulated manner to the main bearing unit,
wherein the main link mechanism comprises a main pillar and a main link, commonly coupling the first surface bow to the main bearing unit,
wherein, when the top is closed, the front bow, the first surface bow and the second surface bow cover an interior space of the convertible, wherein the first surface bow is arranged between the front bow and the second surface bow,
wherein a first supporting link connects the second surface bow in an articulated manner to the main pillar,
wherein a second supporting link connects the second surface bow in an articulated manner to the main link,
wherein the first connecting link is connected in an articulated manner to an end of the lowering-lever being opposite to the main bearing unit, and
wherein the first connecting link is connected in an articulated manner to a rear window frame or a rear window.

37. The top as claimed in claim 36, further comprising an intermediate link, wherein the intermediate link connects the main link of the main link mechanism in an articulated manner to one of the first connecting link and the second connecting link.

38. The top as claimed in claim 1, further comprising at least one control link, wherein the at least one control link is coupled in an articulated manner to exactly one of the first supporting link and the second supporting link, and wherein the at least one control link is connected in an articulated manner to a part of the top arranged outside said main pillar and said main link.

39. A top for a convertible, comprising
a front bow,
a main link mechanism being adapted to displace the front bow with respect to a body-mounted main bearing unit in order to open or to close the top,
a tensioning bow,
a first connecting link connected in an articulated manner to one of a rear window frame and a rear window,
a second connecting link connected at a first joint in an articulated manner to the main bearing unit, and
an additional link connected at a second joint in an articulated manner to the main bearing unit,
wherein the first connecting link is connected in an articulated manner to an end of the second connecting link being opposite to the main bearing unit,
wherein the tensioning bow is articulated at a third joint to the first connecting link at a distance from said second connecting link and said main bearing, and
wherein the tensioning bow is articulated at a fourth joint to the additional link at a distance from said main bearing, such that the second connecting link and the additional link allow the tensioning bow to pivot about said main bearing in the manner of a four-bar linkage.

* * * * *